United States Patent Office 2,897,011
Patented July 28, 1959

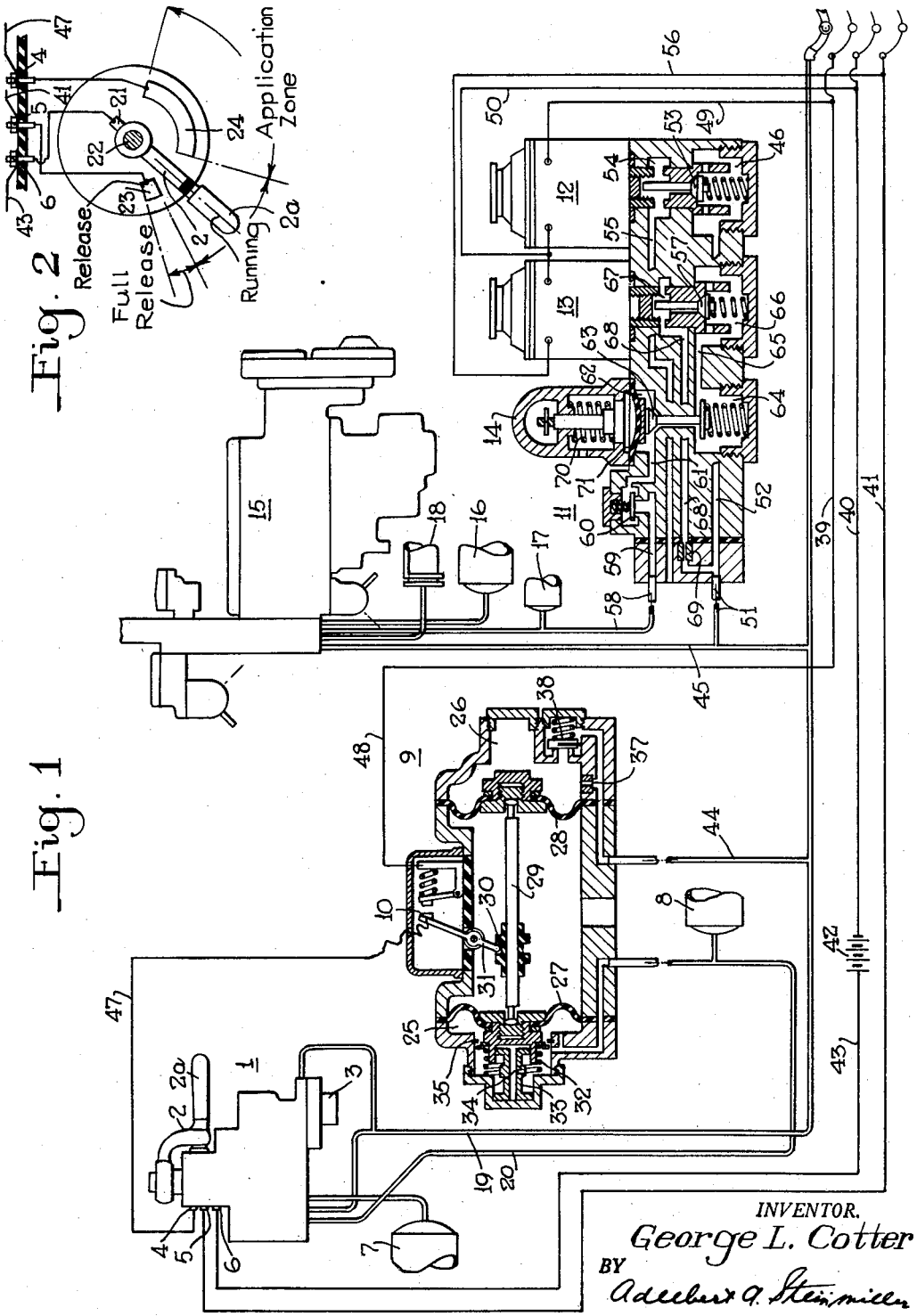

2,897,011

COMBINED PNEUMATIC AND ELECTRO-PNEUMATIC BRAKE CONTROL APPARATUS

George L. Cotter, Pittsburgh, Pa., assignor to Westinghouse Air Brake Company, Wilmerding, Pa., a corporation of Pennsylvania Application November 28, 1955, Serial No. 549,372

12 Claims. (Cl. 303—16)

This invention relates to fluid pressure brake equipment on railway vehicles and more particularly to fluid pressure brake equipment in which there is combined with pneumatic brake control means electro-pneumatic control means for effecting application of the brakes simultaneously on all cars of a train and for effecting release of the brakes simultaneously on all cars of a train.

The principal object of the invention is to provide a passenger car brake equipment including a graduated application and release type brake controlling valve similar to that disclosed in pending application Serial No. 486,771 and now Patent No. 2,802,701, of Glenn T. McClure and assigned to the same assignee, characterized by electrically-controlled means for effecting application and release of the brakes.

Another object of the invention is to provide a combined pneumatic and electro-pneumatic brake control system, for a train of passenger cars, wherein the abovementioned type brake controlling valve effects application and release of the brakes on the cars by variations of pressure in a single train pipe, such as the usual brake pipe, and in which local corresponding variations in the pressure in the brake pipe are effected simultaneously on the different cars by electrical control.

Another object is to provide, in a brake system of the type indicated in the foregoing objects, electrically-controlled means for increasing the pressure in the brake pipe locally on the different cars of a train to accelerate the release of the brakes.

These objects and other objects and advantages will become apparent from the following detailed description of the invention and from the accompanying drawings wherein: Fig. 1 is a diagrammatic view, partly in outline and partly in enlarged section, of an electro-pneumatic brake control system embodying the invention and shown in its normal running position; Fig. 2 is a plan view of the top of the brake valve showing the various positions of the brake valve handle and the respective electric contactors.

Description

As shown in Fig. 1, the brake control system utilizes a brake valve and switch device 1 having a brake valve handle 2, an equalizing valve portion 3, terminals 4, 5 and 6 and the usual components (not shown) of a common self-lapping brake valve device. The self-lapping components (not shown) of the brake valve and switch device 1 operate to supply fluid under pressure from the main reservoir 7 to the equalizing piston chamber (not shown) of the equalizing portion 3 to operate the equalizing valve (not shown) to supply fluid under pressure to the train brake equipment an amount according to the degree of movement of the brake valve handle 2 in the application zone, as will be more fully explained hereinafter. The system also includes an equalizing reservoir 8; a master controller 9 of the diaphragm-operated pressure-responsive type having one switch 10; a magnet valve device 11 including an application magnet valve 12, a release magnet valve 13, a cut-off valve 14 and a brake controlling valve 15 with connected auxiliary reservoir 16, control reservoir 17, and a brake cylinder 18.

The brake valve and switch device 1 operates, as indicated above, to regulate the supply of fluid under pressure from the main reservoir 7 to the brake pipe 19, the equalizing pipe 20 and the equalizing reservoir 8 in accordance with the positioning of the brake valve handle 2. The brake valve handle 2 may be positioned in any of three different zones of the brake valve: the full release position where an accelerated electro-pneumatic full release may be obtained; running position where a normal pneumatic full brake release may be obtained and also the normal running position when brakes have been released; the application position where a graduated electro-pneumatic brake application may be obtained if the brake valve handle 2 is moved in a counterclockwise direction in the application quadrant as viewed in Fig. 2, or a wholly pneumatic graduated release may be obtained if the brake valve handle is moved in a clockwise direction in the application quadrant as viewed in Fig. 2. A more detailed explanation of the positioning and the results of said positioning of the brake valve handle 2 will be found hereinafter. Associated with the brake valve handle 2 is a switch segment 21 which is connected internally to the supply terminal 6 and externally to the brake valve handle which is insulated electrically from the usual brake valve shaft 22. An insulated hand grip 2a is also provided on the handle 2 to protect the operator. Other switch segments 23 and 24 are similarly connected internally to the respective application and release terminals 4 and 5 and constructed such that when the brake valve handle 2 is in release position a circuit is completed between the switch segments 21 and 23 by way of the handle 2 or when the handle is in the application position, a circuit is completed between switch segments 21 and 24 by way of the handle 2.

The master controller 9 embodies two chambers 25 and 26 separated by diaphragms 27 and 28 with a rod 29 interposed and connected therebetween. A rod follower 30 is attached to the rod 29, and any transverse movement of the rod 29 is transferred by means of the rod follower to the application switch 10 by way of a pivotally mounted lever arm 31. It can be seen from Fig. 1 in which the master controller device is shown in open position that sufficient movement of the rod 29 to the left will instigate closing of the application contact 10. Chamber 25 is connected to the equalizing reservoir 8 and equalizing pipe 20, such that the fluid of pressure in chamber 25 is the same as that in the equalizing reservoir 8, equalizing pipe 20 and in the equalizing piston chamber of the equalizing portion 3 of the brake valve and switch device 1. A spring 32 and a dash pot piston 33 with a choke 34 encased in chamber 25 serves to stabilize movement of the diaphragm 27, and snap ring 35 limits movement of the diaphragm 27 and connected rod 29 in a right-hand direction as viewed in Fig. 1. The spring 32 is provided to bias diaphragm 27 and connected rod 29 to the right against the snap ring 35 in a neutral position such that the application switch 10 is maintained open when the pressures in the two chambers 25 and 26 are equal. Chamber 26 is connected to the brake pipe 19 such that pressure of fluid therein is equal to brake pipe pressure. A choke 37 is utilized to prevent surges of brake pipe pressure from causing any undesired application as will be more fully understood hereinafter. A spring seated check valve 38 is provided in chamber 26 such that during a brake application when brake pipe is being vented, the chamber 26 may be vented with unrestricted flow such that the application switch 10 will not be maintained closed any longer than desired as will be more fully understood in the description of operation of the master controller 9.

The brake controlling valve 15 is of the self-lapping graduated application and release type similar to that presently proposed for use on European railroads, said controlling valve being adapted to control the brakes on a vehicle according to the degree of reduction and restoration of pressure of fluid in the brake pipe relative to a datum pressure in a control reservoir. Since details of this control valve are not essential to the understanding of the present invention, no further description of the control valve is deemed necessary here.

The apparatus shown in Fig. 1 is locomotive equipment, individual car equipments on each car (not shown) comprise essentially the same devices shown in Fig. 1 with the omission of a brake valve and switch device, a master controller and an equalizing reservoir and main reservoir. Thus the car equipment comprises only the magnet valve device 11 and the brake controlling valve device 15 with the associated reservoirs 16 and 17 and brake cylinder 18, each car equipment being interconnected by a brake pipe 19, and the control wires throughout the train. The control wires in this instance comprise: an application wire 49, a battery return wire 40 and a release wire 41, the battery return wire being connected on the locomotive to a battery 42 which in turn is connected to the brake valve and switch device 1 by way of battery supply wire 43.

Operation

In operation, when the brake valve handle 2 is in running position, the brake valve and switch device 1 operates in the usual manner to supply fluid under pressure from the main reservoir 7 through the operating portions (not shown) of the brake valve and switch device 1 to the brake pipe 19, the equalizing pipe 20, and the equalizing reservoir 8 to charge said pipes and reservoir to a predetermined normal pressure. With the equalizing pipe 20 and equalizing reservoir 8 charged, it can be seen that chamber 25 of the master controller 9 will likewise be charged to an equal pressure. With the brake pipe 19 charged it can be seen that chamber 26 of the master controller device 9 will likewise be charged to brake pipe pressure through a branch pipe 44. A branch pipe 45 of the brake pipe 19 will also be charged to supply fluid under pressure to the operating portions (not shown) of the brake controlling valve device 15, and to charge the auxiliary reservoir 16 and the control reservoir 17 to a similar pressure as that in the brake pipe under the control of the valve device 15. A chamber 46 in the application magnet valve 12 is also charged with fluid under pressure from the branch pipe 45.

When a brake application is desired, the brake valve handle 2 is moved from the running (that is, valve release) position to the application position; in which position the brake valve 1 functions in the usual manner to vent the equalizing piston chamber (not shown) in the equalizing portion 3 of the brake valve and switch device 1 and the equalizing reservoir 8, to cause the equalizing valve portion to effect a corresponding reduction in brake pipe fluid pressure as is hereinafter explained. A reduction of brake pipe pressure relative to the bottled-up pressure in the control reservoir 17 effects operation of the brake controlling valve 15 to effect a brake application in the usual manner by establishing a communication through which fluid under pressure is supplied from the auxiliary reservoir 16 to the brake cylinder 18. Also with the brake valve handle 2 in application position, the application terminal 4 is connected to supply terminal 6 by way of the switch segment 24, handle 2 and switch segment 21 of the brake valve and switch device as heretofore explained. The reduction of fluid under pressure in the equalizing piston chamber of the equalizing portion of the brake valve and switch device 1 in a normal manner and the reduction of fluid under pressure in the equalizing reservoir 8 and connected equalizing pipe 20 causes a reduction in fluid in chamber 25 of the master controller 9 to effect operation of the master controller 9 such that the rod 29 is moved to the left by the higher fluid pressure in the chamber 26. The rod follower 30 attached to the rod 29 is likewise moved to the left to cause the pivotally-mounted application switch 10 to close and thereby complete a circuit for energizing the application magnet 12 on the locomotive and the application magnets 12 of the magnet valve devices 11 of each car throughout the train. This circuit may be traced from the supply terminal 6 (connected to the battery 42 by way of wire 43), thence by way of the internal portions of the brake valve and switch device previously described, to the terminal 4, wire 47, application switch 10 in its closed position, wire 48 to the application train wire 39 extending throughout the train, branch wire 49 on each car of the train to the individual application magnet valves 12 on each magnet valve device 11 and branch return wire 50 on each car of the train to the common battery return wire 40 extending throughout the train. With the application magnet valves, on each car energized, the brake pipe fluid pressure is reduced simultaneously on each car by way of branch pipe 45, pipe 51, passage 52 in the magnet valve device 11, chamber 46 of the application magnet valve 12, past the application valve 53 unseated in its energized condition, chamber 54 and a passage 55 to the atmosphere to vent brake pipe pressure until the brake pipe pressure in chamber 26 of the master controller device 9 is reduced substantially to that in chamber 25, at which time the spring 32 in the chamber 25 will cause the rod 29 to move to the right to its normal position against the snap ring 35 and open the application switch 10 to interrupt the previously-traced energizing circuit for the application magnet valves 12 and thus effect the deenergization thereof. Magnet valves 12 thus being returned to closed position, stops further venting of the brake pipe. Brake controlling valve device 15 thus operates to cause the brakes to remain applied to the attained degree corresponding to brake pipe pressure reduction.

It should be noted that the application of the brakes with this equipment is a combined pneumatic and electro-pneumatic application both operating simultaneously, the electro-pneumatic control being the predominant control of the braking means with the pneumatic (normal operation of the controlling valve 15 by the venting of brake pipe through the brake valve handle switch device 1) merely a standby control of the braking means which acts concurrently.

To release the brakes, the brake valve handle 2 now in the application zone is moved clockwise in the application zone back toward its running position such that a graduated release of the brake application is effected as follows: The self-lapping valve portion of the brake valve and switch device 1 operates with the clockwise movement of the brake valve handle 2 to effect operation of the equalizing valve (not shown) of the equalizing portion 3 to charge the brake pipe with fluid under pressure in the usual manner in accordance with the degree of movement of the brake valve handle 2 back toward its running position. Simultaneously with the charging of the brake pipe, the equalizing pipe and equalizing reservoir are charged to the same degree as is the brake pipe. However, the charging of the chamber 25 of the master controller device 9 is at a faster rate than the charging of the chamber 26 due to the volume of the brake pipe combined with chamber 26 being larger and also due to the choke 37 in the communication to chamber 26 restricting the charging of chamber 26 such that the rod 29 and rod follower 30 are moved to the right to effect opening of the application switch 10 to deenergize the application magnets as explained and stop venting of the brake pipe. If the brake control is already in lap position, the chamber 25 will merely be charged without effecting any further movement of the rod 29 in the right-hand direction, due to the snap ring 35 limiting the movement of the rod. The charging of the brake pipe and equalizing pipe and equalizing reservoir continues until they are charged to the pressure desired as is indicated by the amount of movement of the brake valve handle 2. It can thus be seen that a graduated pneumatic release of the brake application may be obtained in this manner by stepping the brake valve handle clockwise in the application zone. If, however, the brake valve handle is moved to the running position, a full pneumatic release is obtained without graduation.

If an accelerated brake release is desired, the brake valve handle 2 is moved clockwise to the full release position, as shown in Fig. 2, in which position the switch segment 23 is connected via the brake valve handle 2 to the switch segment 21 which in turn is connected internally to the supply terminal 6, the switch segment 23 being connected internally to the release terminal 5. As so connected, a circuit is completed from the battery 42 via supply wire 43 to the supply terminal 6 through the brake valve switch device 1 as just explained to the release terminal 5 and thence by way of the release wire 41 throughout the train, branch wire 56 on each car of the train to the individual release magnet valves 13 on each magnet valve device 11 and branch return wire 50 on each car to the common battery return wire 40 extending throughout the train. With this circuit completed the release magnet valve devices 13 on the locomotive and on each car of the train will be energized to open the corresponding release valve 57 to connect the control reservoirs 17 on the locomotive and on each car to the brake pipe 19 to effect a quick recharge of the brake pipe and equalize the pressures acting on the service piston (not shown) of the controlling valve 15 such that a quick release is effected. In the service portion (not shown) of the controlling valve 15 the control reservoir pressure is reduced by venting to the brake pipe to increase the brake pipe pressure which was lowered during brake application and the brake cylinder pressure is vented to atmosphere. Thus a complete and direct release of the brakes is effected throughout the train in a minimum of time. The control reservoir 17 is vented to the brake pipe 19 by way of a pipe 58 to the magnet valve device 11, passage 59, past a check valve 60, passage 61 to a chamber 62 of the cutoff valve 14, past the valve 63 normally unseated as long as the pressure in chamber 62 and consequently in control reservoir 17 is above a predetermined safe pressure (explained more fully hereinafter), chamber 64, passage 65, chamber 66 of the release magnet valve 13, past the unseated release magnet valve 13, past the unseated release valve 57 to chamber 67, passage 68, choke 69, passage 52, pipe 51 and branch pipe 45 to the brake pipe 19. It should be noted that the control reservoir may be vented to atmosphere instead of brake pipe, however, it is believed to be more advantageous to vent to brake pipe as is shown and described herein.

It can thus be seen that a full accelerated electro-pneumatic brake release is obtained when the brake valve handle 2 is in its full release position. However, it should be noted that simultaneous with the accelerated electro-pneumatic release a normal pneumatic release may be obtained by use of the self-lapping portion of the brake valve and switch device 1 and normal operation of the controlling valve 15. However, this accompanying normal pneumatically effected brake release is of little consequence due to more rapidly effected electro-pneumatic brake release, and therefore serves only in a standby capacity.

The cut-off valve 14 is constructed such that chamber 62 thereof is connected to the control reservoir and therefore the pressure of fluid in chamber 62 is equal to control reservoir pressure. This pressure in chamber 62 opposes the predetermined spring pressure of a biasing spring 70 separated from chamber 62 by a diaphragm 71. The cut-off valve operates such that when the control reservoir pressure is being vented to brake pipe during release, as previously explained, the biasing spring 70 moves downward to close the valve 63 to cut off the venting of control reservoir at a predetermined safe pressure of control reservoir as regulated by adjustment of the biasing spring 70 such that a certain sufficient pressure is maintained in the control reservoirs to provide a brake application should one be necessary before the brake system is completely recharged.

It can thus be seen that I have provided an improved combined electro-pneumatic brake control system for a brake equipment of the type employing a graduated application and release type brake controlling valve. With this system it is possible to make an electro-pneumatic application simultaneously on each car, said application being graduated in accordance to brake valve handle position and lapped by use of the master controller as in any common electro-pneumatic system, a pneumatic graduated release as characterized by the controlling valve operation when operating with the brake valve when the brake valve handle is moved toward a running position, and a direct accelerated release simultaneously throughout each car of the train by use of the electro-pneumatic operation in release position. I have further provided a safety cut-off feature to limit the amount of reduction of control reservoir pressure during electrically-controlled accelerated release such that an application may be made even after a complete direct electro-pneumatic release of the brakes.

While I have illustrated and described but one embodiment of my invention, it is to be understood that this embodiment is capable of variation and modification and I therefore do not wish to be limited to the precise details set forth, but desire to avail myself with such alterations as fall within the scope of the following claims.

Having now described the invention, what I claim as new and desire to secure by Letters Patent is:

1. In a brake equipment for a train of cars, in combination, a brake cylinder on each car, a brake pipe normally charged with fluid under pressure, a control reservoir on each car normally charged with fluid under pressure equivalent to the normal pressure in the brake pipe, a brake controlling valve device of the graduated application and graduated release type on each car subject opposingly to the pressures in the brake pipe and brake cylinder against that in the control reservoir, operable upon a reduction of brake pipe pressure below the control reservoir pressure to cause fluid under pressure to be supplied to the brake cylinder to effect a brake application of a degree according to the differential between the brake pipe pressure and the control reservoir pressure, and operable upon an increase in brake pipe pressure after a brake pipe reduction to effect a brake release of a degree according to the decrease in differential between the brake pipe pressure and control reservoir pressure, and also operable during a brake application responsively to a decrease in control reservoir pressure resulting in reduction of the differential between the brake pipe pressure and the control reservoir pressure for effecting a brake release, first electrically controlled valve means operable to effect a concurrent reduction in brake pipe pressure locally on each car of the train to cause said brake controlling valve devices to effect a brake application, and second electrically controlled valve means operable to effect release of control reservoir pressure during a brake application to cause said brake controlling valve devices to effect a prompt brake release operation locally on each car of the train.

2. In a brake equipment for a train of cars, in combination, a brake cylinder on each car, a brake pipe normally charged with fluid under pressure, a control reservoir on each car normally charged with fluid at a selected datum pressure equivalent to the normal brake pipe pressure, a brake controlling valve device of the graduated release and graduated application type on each car subject opposingly to the pressures in the brake pipe and brake cylinder against that in the control resservoir, operable upon a reduction of brake pipe pressure below the control reservoir pressure to cause fluid under pressure to be supplied to the brake cylinder to effect a brake application of a degree according to the pressure differential acting on said brake controlling valve, and operable after a brake pipe reduction upon an increase in brake pipe pressure to effect a brake release of a degree according to the decrease in pressure differential acting on said brake controlling valve, and also operable after a brake pipe reduction upon a reduction in control reservoir pressure resulting in a reduction of the pressure differential on said brake controlling valve for effecting a brake release; first electrically controlled valve means for effecting a reduction in brake pipe pressure locally on each car of the train to cause said brake controlling valve devices to effect a brake application; and a second electrically controlled valve means operable after a brake pipe reduction to effect a supply of fluid under pressure from the control reservoirs locally on each car of the train to the brake pipe to cause said brake controlling valve devices to effect an accelerated brake release operation on each car of the train.

3. In a brake equipment for a train of cars, in combination, a brake cylinder on each car, a brake pipe normally charged with fluid under pressure, a control reservoir on each car normally charged with fluid to a selected datum pressure equivalent to the normal brake pipe pressure, a brake controlling valve device of the graduated application and graduated release type on each car subject opposingly to the pressures in the brake pipe and brake cylinder against that in the control reservoir, operable upon a reduction of brake pipe pressure below said control reservoir pressure to cause fluid under pressure to be supplied to the brake cylinder to effect a brake application of a degree according to the differential between the brake pipe pressure and the control reservoir pressure and operable upon an increase in brake pipe pressure after said reduction to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release, an equalizing reservoir normally charged with fluid under pressure equivalent to the normal brake pipe pressure, first magnet valve means on each car of the train for concurrently controlling the reduction of brake pipe pressure throughout the train to cause said brake controlling valve devices to effect a brake application, master switch means operative responsively to reduction in equalizing reservoir pressure below the brake pipe pressure for electrically controlling said first magnet valve means throughout the train, second magnet valve means on each car of the train for controlling said decrease in control reservoir pressure, and brake valve means operable in one position to control said second magnet valve means to effect said decrease in control reservoir pressure during a brake application to cause said brake controlling valve devices to effect a prompt brake release operation locally on each car of the train.

4. In a brake equipment for a train of cars, in combination, a brake cylinder on each car, a brake pipe normally charged with fluid under pressure, a control reservoir on each car normally charged with fluid under pressure equivalent to the normal brake pipe pressure, a brake controlling valve device of the graduated application and graduated release type on each car subject opposingly to the pressures in the brake pipe and brake cylinder against that in the control reservoir, and operable upon a reduction of brake pipe pressure below the control reservoir pressure to cause fluid under pressure to be supplied to said brake cylinder to effect a brake application of a degree according to the differential between the brake pipe pressure and the control reservoir pressure, and operable after brake pipe reduction upon an increase in brake pipe pressure to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release; a first electric circuit means, second electric circuit means, first electrically controlled valve means on each car operable responsively to energization of said first electric circuit means to effect a concurrent reduction in brake pipe pressure locally on each car of the train to cause said brake controlling valve devices to effect a brake application, and second electrically controlled valve means on each car operable responsively to energization of said second electric circuit means to supply control reservoir pressure to said brake pipe to effect a concurrent increase in brake pipe pressure locally on each car of the train during a brake application to cause said brake controlling valve devices to effect a prompt brake release operation locally on each car of the train.

5. In a brake equipment for a train of cars, in combination, a brake cylinder on each car, a brake pipe normally charged with fluid under pressure, a control reservoir on each car normally charged with fluid under pressure equivalent to the normal brake pipe pressure, a brake controlling valve device of the graduated application and graduated release type on each car subject opposingly to the pressures in the brake pipe and brake cylinder against that in the control reservoir, and operable upon a reduction of brake pipe pressure below the control reservoir pressure to cause fluid under pressure to be supplied to said brake cylinder to effect a brake application of a degree according to the differential between the brake pipe pressure and the control reservoir pressure, and operable after a brake pipe reduction upon an increase in brake pipe pressure to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release; electric circuit means, brake valve means operable by movement of a brake valve handle to various positions to control charging of said brake pipe with fluid under pressure, switch means controlled by said brake valve in one position to effect energization of said electric circuit means to cause supply of control reservoir pressure to the brake pipe to effect a concurrent increase in brake pipe pressure locally on each car of the train during a brake application to cause said brake controlling valve devices to effect a prompt brake release operation locally on each car of the train.

6. In a brake equipment for a train of cars, in combination, a brake cylinder on each car, a brake pipe normally charged with fluid under pressure, a control reservoir on each car normally charged with fluid under pressure equivalent to the normal brake pipe pressure, a brake controlling valve device of the graduated application and graduated release type on each car subject opposingly to the pressures in the brake pipe and brake cylinder against that in the control reservoir, and operable upon a reduction of brake pipe pressure below the control reservoir pressure to cause fluid under pressure to be supplied to said brake cylinder to effect a brake application of a degree according to the differential between the brake pipe pressure and the control reservoir pressure; and operable after a brake pipe reduction upon an increase in brake pipe pressure to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release, a first electric circuit means, second electric circuit means, brake valve means operable by movement of a brake valve handle to various positions to control charging and venting of said brake pipe, first switch means controlled by said brake valve in an application position to effect energization of said first circuit means, second switch means controlled by said brake valve in a full release position to effect energization of said second circuit means, first electrically controlled valve means on each car operable responsively to energization of said first electric circuit means to effect a concurrent reduction in brake pipe pressure locally on each car of a train to cause said brake controlling valve devices to effect a brake application, second electrically controlled valve means on each car operable responsively to energization of said second electric circuit means to supply control reservoir pressure to the brake pipe to effect a concurrent increase in brake pipe pressure locally on each car of a train during a brake application to cause said brake controlling valve devices to effect a prompt brake release operation locally on each car of the train.

7. In a brake equipment for a train of cars, in combination, a brake cylinder in each car, a brake pipe normally charged with fluid under pressure, a control reservoir on each car normally charged with fluid under pressure equivalent to the normal brake pipe pressure, a brake controlling valve device of the graduated application and graduated release type on each car subject opposingly to the pressures in the brake pipe and brake cylinder against that in the control reservoir, and operable upon a reduction of brake pipe pressure below the control reservoir pressure to cause fluid under pressure to be supplied to said brake cylinder to effect a brake application of a degree according to the differential between the brake pipe pressure and the control reservoir pressure, and operable after a brake pipe reduction upon an increase in brake pipe pressure to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release, a first electric circuit means, a second electric circuit means, brake valve means operable by movement of a brake valve handle to first and second positions to control charging and venting of said brake pipe, master switch means adapted to be closed when said brake valve handle is in said first position, application switch means controlled by said brake valve handle in said first position to operate cooperatively with said master switch means in said closed position to effect energization of said first circuit means, release switch means controlled by said brake valve handle in said second position to effect energization of said second circuit means, first electrically controlled valve means on each car operable responsively to energization of said first electric circuit means to effect a concurrent reduction in brake pipe pressure locally on each car of a train, and second electrically controlled valve means on each car operable responsively to energization of said second electric circuit means to supply control reservoir pressure to the brake pipe to effect a concurrent increase in brake pipe pressure locally on each car of a train to cause operation of said brake controlling valve devices to effect acceleration of the brake release operation.

8. In a brake equipment for a train of cars, in combination, a brake cylinder on each car, a brake pipe normally charged with fluid under pressure, a control reservoir on each car normally charged with fluid to a selected datum pressure equivalent to the normal brake pipe pressure, a brake controlling device of the graduated application and graduated release type on each car subject opposingly to the pressures in the brake pipe and brake cylinder against that in the control reservoir, operable upon a reduction of brake pipe pressure below the fluid pressure in the control reservoir to cause fluid under pressure to be supplied to said brake cylinder to effect a brake application of a degree according to the differential between the brake pipe pressure and the control reservoir pressure and operable upon a subsequent increase in brake pipe pressure to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release, first magnet valve means on each car operative to cause a reduction of brake pipe pressure second magnet valve means on each car operative to cause a reduction in control reservoir pressure, cut-off valve means on each car responsive to reduction of control reservoir pressure below a certain value to render said second magnet valve means thereafter ineffective to release fluid under pressure from the control reservoir, and brake valve means effective in one position to cause operation of said first magnet valve means, and effective in a second position to cause operation of said second magnet valve means, and effective in another position to cause an increase in brake pipe pressure pneumatically.

9. In a brake equipment for a train of cars, in combination, a brake cylinder on each car, a brake pipe normally charged with fluid under pressure, a control reservoir on each car charged with fluid under pressure to a datum pressure equivalent to the normal brake pipe pressure, a brake controlling valve device of the graduated application and graduated release type on each car subject opposingly to the pressures in the brake pipe and brake cylinder against that in the control reservoir, operable upon a reduction of brake pipe pressure below the pressure of the control reservoir to cause fluid under pressure to be supplied to said brake cylinder to effect a brake application of a degree according to the differential between the brake pipe pressure and the control reservoir pressure, and operable upon a subsequent increase in brake pipe pressure to effect a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting a brake release, an equalizing reservoir normally charged with fluid under pressure equivalent to the normal brake pipe pressure, first magnet valve means on each car operative upon energization to effect a reduction in brake pipe pressure to cause said brake controlling valve devices to effect locally on each car a brake application of a degree according to the differential between the brake pipe pressure and the control reservoir pressure, master switch means subject in opposing relation to the forces exerted by the pressure in the equalizing reservoir and by the pressure in the brake pipe and operative responsively to a reduction in equalizing reservoir pressure below the brake pipe pressure for energizing said first magnet valve means, second magnet valve means on each car operable upon energization to vent fluid under pressure from said control reservoirs to accelerate operation of the brake controlling valve devices to effect the brake release on each car, brake valve means operative in one position to reduce equalizing reservoir pressure and brake pipe pressure to effect operation of said master switch means, operative in a second position to increase brake pipe pressure to effect a graduated pneumatic brake release, and operative in another position to effect energization of said second magnet valve means and recharging of the brake pipe.

10. In a brake equipment for a train of cars, in combination, a brake cylinder on each car, a brake pipe normally charged with fluid under pressure, a control reservoir on each car normally charged with fluid under pressure to a degree equal to normal full charge value of brake pipe pressure, a brake controlling valve device of the graduated application and graduated release type on each car subject opposingly to the pressures in the brake pipe and brake cylinder against that in the control reservoir, operative in response to a reduction in brake pipe pressure below control reservoir pressure to cause fluid under pressure to be supplied to said brake cylinder to cause a brake application of a degree according to the differential between the brake pipe pressure and the control reservoir pressure, and responsive to a subsequent increase in brake pipe pressure to cause a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting an accelerated brake release, first electrically controlled means on each car operative when energized to cause a reduction of fluid pressure in said brake pipe to effect a brake application, second electrically controlled means on each car operative when energized to cause a reduction in control reservoir pressure to accelerate operation of the brake controlling valve device to effect a brake release, equalizing reservoir means normally charged with fluid under pressure to the normal full charge value of brake pipe pressure, master switch means subject in opposing relation to the forces exerted by the equalizing reservoir pressure and by the pressure of fluid in the brake pipe and operative to a closed position in response to a reduction in equalizing reservoir pressure below brake pipe pressure, brake valve and switch means having a simultaneously operative valve portion and switch portion, said brake valve and switch means being operative in one position such that said valve portion effects charging of said brake pipe and of said equalizing reservoir, said brake valve and switch means being operative in a second position such that said valve portion effects a reduction in equalizing reservoir pressure and said switch portion in cooperation with said master switch means in its closed position effects energization of said first electrically controlled means, said valve portion being operative while the brake valve and switch means is maintained in its said second position after brake pipe pressure has been reduced to a value substantially equal to equalizing reservoir pressure to effect termination of said reduction of equalizing reservoir pressure to cause operation of said master switch means to its open position to effect deenergization of said first electrically controlled means, and said brake valve and switch means being operative in a third position such that such said valve portion effects recharge of said brake pipe and of said equalizing reservoir and said switch portion effects energization of said second electrically controlled means to cause a reduction of said control reservoir pressure resulting in said accelerated operation of the brake controlling valve devices to effect a prompt brake release.

11. The combination as set forth in claim 10 including a cut-off valve means on each car operable in response to a predetermined low fluid pressure in said control reservoirs to render said second electrically controlled means ineffective to effect a further reduction of control reservoir pressure.

12. In a brake equipment for a train of cars, in combination, a brake cylinder on each car, a brake pipe normally charged with fluid under pressure, a control reservoir on each car normally charged with fluid under pressure to a degree equal to normal full charge value of brake pipe pressure, a brake controlling valve device of the graduated application and graduated release type on each car subject opposingly to the pressures in the brake pipe and brake cylinder against that in the control reservoir, operable in response to a reduction in brake pipe pressure below control reservoir pressure to cause fluid under pressure to be supplied to said brake cylinder to cause a brake application of a degree according to the differential between the brake pipe pressure and the control reservoir pressure, and responsive to a subsequent increase in brake pipe pressure to cause a brake release of a degree according to the decrease in differential between the brake pipe pressure and the control reservoir pressure, and also operable during a brake application responsively to a decrease in control reservoir pressure resulting in reduction of the differential between the brake pipe pressure and the control reservoir pressure for effecting an accelerated brake release, first magnet valve means on each car operative when energized to cause a local reduction of fluid under pressure in said brake pipe to effect a brake application of a degree according to the differential between the brake pipe pressure and the control reservoir pressure, second magnet valve means on each car operative when energized to cause a release of fluid under pressure from the control reservoir on the same car into the brake pipe to accelerate operation of the brake controlling valve devices to effect a brake release, cut-off valve means on each car operative in response to a predetermined low pressure in the control reservoir on the same car to render said second magnet valve means ineffective to effect further release of fluid under pressure from the control reservoir, equalizing reservoir means normally charged with fluid under pressure to the normal full charge value of brake pipe pressure, master switch means subject in opposing relation to the forces exerted by the equalizing reservoir pressure and by the pressure of fluid in the brake pipe and operative to a closed position in response to a reduction in equalizing reservoir pressure below brake pipe pressure and operative to an open position in response to consequent reduction in brake pipe pressure to substantially equal value as the equalizing reservoir pressure, brake valve and switch means having a simultaneously operative valve portion and switch portion, said brake valve and switch means being operative in one position such that said valve portion effects charging of said brake pipe and of said equalizing reservoir, said brake valve and switch means being operative by movement of a brake valve handle from said one position to a second position such that said valve portion effects a reduction of equalizing reservoir pressure an amount according to the degree of movement of said brake valve handle, and said switch portion in cooperation with said master switch means in its closed position effects energization of said first magnet valve means, said valve portion being operative while said brake valve handle is maintained in said second position after brake pipe pressure has been reduced to a value substantially equal to equalizing reservoir pressure to effect termination of said reduction of brake pipe pressure to cause operation of said master switch means to its open position to effect deenergization of said first magnet valve means and to effect a lapped condition of the brakes, said brake valve and switch means being operative by movement of said brake valve handle from said second position toward said one position such that said valve portion effects recharging of said brake pipe and of said equalizing reservoir an amount according to the degree of said movement of said brake valve handle to cause a graduated release of the brakes, and said switch portion is effective to maintain said first magnet valve means deenergized, said brake valve and switch means being operable in said one position consequent to being in said second position to fully recharge said brake pipe and said equalizing reservoir to cause a normal full brake release, and said brake valve and switch means being operative in a third position such that said valve portion effects full recharge of said brake pipe and said equalizing reservoir and said switch portion effects energization of said second magnet valve means to cause said release of control reservoir pressure to brake pipe to accelerate operation of said brake controlling devices to cause an accelerated full release of the brakes.

References Cited in the file of this patent
UNITED STATES PATENTS

| | | |
|---|---|---|
| 1,183,913 | Turner | May 23, 1916 |
| 1,282,130 | Sloan et al. | Oct. 22, 1918 |
| 1,316,204 | Turner | Sept. 16, 1919 |
| 1,442,692 | McAvoy | Jan. 16, 1923 |
| 2,039,827 | Nicholson | May 5, 1936 |
| 2,170,240 | Fitch | Aug. 22, 1939 |